(12) United States Patent
Chen et al.

(10) Patent No.: US 6,470,170 B1
(45) Date of Patent: Oct. 22, 2002

(54) SYSTEM AND METHOD FOR INTERACTIVE DISTANCE LEARNING AND EXAMINATION TRAINING

(76) Inventors: Hai Xing Chen, 77 Gerrard Street West, Apt# 905, Toronto (CA), M5G 2A1; Qiang Li, 720 Fairlands Ave., Campbell, CA (US) 95008

( * ) Notice: Subject to any disclaimer, the term of this patent is extended or adjusted under 35 U.S.C. 154(b) by 27 days.

(21) Appl. No.: 09/858,620

(22) Filed: May 16, 2001

Related U.S. Application Data

(60) Provisional application No. 60/205,633, filed on May 18, 2000.

(51) Int. Cl.[7] .................................................. G09B 3/00
(52) U.S. Cl. ....................................................... 434/350
(58) Field of Search ................................ 434/350, 352, 434/362, 322, 323, 327, 307 R, 308

(56) References Cited

U.S. PATENT DOCUMENTS

| | | | | |
|---|---|---|---|---|
| 5,963,914 A | * | 10/1999 | Skinner et al. | ............... 705/10 |
| 6,141,529 A | * | 10/2000 | Remschel | .................... 434/350 |
| 6,157,808 A | * | 12/2000 | Hollingsworth | ............. 434/350 |
| 6,304,864 B1 | * | 10/2001 | Liddy et al. | ................... 706/15 |
| 2001/0039003 A1 | * | 11/2001 | Huang | ......................... 434/350 |

\* cited by examiner

*Primary Examiner*—Hieu T. Vo
(74) *Attorney, Agent, or Firm*—CUSPA Technology Law Associates

(57) ABSTRACT

A system for learning and examination training is disclosed. A student can log on the system through a website to review training history, to access a menu of levels of practice examinations of interest to him, and to select training exams on the website. During the examination, the student is able to indicate whether or not help is required at any given point or question. Without regard to whether or not the student believes help is required, all students are subject to a dynamic/interactive evaluation of responses in which a teacher who is on-line with the same website at the time of the student is able to intervene during an examination to invoke help options for the student. In the first instance, the teacher can intervene to change the exam level to either a lower or to a higher one. Among the help options available to a student during an examination within a given level are "auto coach" in which the student is provided with hints and examples; an adaptive question selection in which variations of the same questions are drawn from a database; real time talk support in which the on-line teacher can communicate with the student at the time that this option is invoked; and a multi-solution select option in which a database presents multiple means of problem to accommodate or discover the learning style of the student. The student can be scored, timed and graded in a variety of modes both during and after the examination.

24 Claims, 2 Drawing Sheets

SYSTEM AND METHOD FOR INTERACTIVE DISTANCE LEARNING AND EXAMINATION TRAINING

CROSS REFERENCE TO RELATED APPLICATION

This application corresponds in subject matter to Provisional Application serial No. 60/205,633, filed May 18, 2000, which is herein incorporated by reference in its entirety.

FIELD OF THE INVENTION

This invention relates generally to a system and method for interactive distance teaching and learning to enable students to increase their knowledge and proficiency in test examinations.

BACKGROUND OF THE INVENTION

Over time, numerous educational methods and theories of teaching and training for examination, have developed, these including live instructions, voice means, audio means, pictures, animation, symbolism, analogy, and repetition.

With the advent of the computer age, modern adaptations of these methods have appeared in the form of software, examples of which appear in U.S. Pat. No. 5,902,114 (1999) to Erickson, entitled Method of Teaching Formulation of Mathematical Word Problems, and U.S. Pat. No. 6,015,297 (2000) to Liberman, entitled Method of Teaching an Examinee to Take a Multiple Choice Examination. Certain teaching methods, and software supportive thereof, particularly stress the importance of interactivity between the student and teacher. Such methods, and expert training software to facilitate the same are reflected in such patents as U.S. Pat. No. 5.441,415 (1995) to Lee, et al, entitled Interactive Computer Aided Natural earning Method and Apparatus, and U.S. Pat. No. 6,016,486 (2000) to Nichols, entitled System Method and Article of Manufacture for a Goal Based System utilizing an Activity Table.

Notwithstanding sophisticated software, as is reflected in the above, few systems have appeared which are both interactive in real time and which are suitable for use with distance learning through means of the worldwide global network, hereinafter referred to as the Internet. This is particularly the case with respect to teaching situations where the goal is to train students in the taking of examinations without compromise of the cognitive educational experience. It is well known that, while a given student may have gained, whether through the classroom experience or otherwise, substantial knowledge with respect to a particular subject, the same does not infer that such a student is capable of expressing such understanding in terms of proficiency in the taking of an examination with reference to such subject. Accordingly, the art of training a student to take examinations has evolved as one different and apart from generalized methods of education, whether they are implemented in the classroom, by television, video, Internet, or other means. In view thereof, the present invention can be understood in terms of its primary focus, that is, an Internet-based method and system to train students in particular skills that are applicable in the taking of examinations.

SUMMARY OF THE INVENTION

The present invention provides a system of interactive distance learning and examination training comprising a website having a graphical user interface; an archival training database accessible from said web site, said training database containing a menu of levels of practice examinations accessible through said graphical user interface; a module interface means which notifies a teacher or artificial intelligence module that a student has logged onto said website; a mean for selection by said student of one of said examinations from said practice examination; a means to enable a student to provide an answer to said examination through said graphical user interface; a means for providing selectable on line student help options available to a student after an examination has commenced; a means for evaluation of student answers; and a means for generating performance displays of said student the examination selected by said student and a database for storing information associated with each examination taken by said student.

The system also provides that the means for providing selectable student help options comprises options for self-help, adaptive question selection, on-line interaction with said teacher, and review of multiple possible solutions. In addition, the system provides that the means for evaluation of student responses comprises changing the difficulty level of questions contained in said examination while the student is taking the examination.

The present invention also provides a method of an interactive distance learning and examination training comprising providing a website having a graphical user interface; providing an archival training database accessible from said web site, said training database containing a menu of levels of practice examinations accessible through said graphical user interface; providing a module interface means which notifies a teacher or artificial intelligence module that a student has logged onto said website; selecting by said student of one of said examinations from said practice examination; enabling a student to provide an answer to said examination through said graphical user interface; providing selectable on line student help options available to a student after an examination has commenced; evaluating of the student answers; and generating performance displays of said student the examination selected by said student and a database for storing information associated with each examination taken by said student.

Moreover, the method provides selectable student help options comprises options for self-help, adaptive question selection, on-line interaction with said teacher, and review of multiple possible solutions. Still further the method of evaluating of student answers comprises changing the difficulty level of questions contained in said examination while the student is taking the examination.

Still further the method provides enabling a student to provide an answer to said examination through said graphical user interface comprises a keystroke, audio response, graphic display, web TV interface, graphical user interface pointer or touch screen means, and mouse.

The advantages of the present invention will become apparent from the Brief Description of the Drawings and Detailed Description of the Invention set forth herein.

DETAILED DESCRIPTION OF THE INVENTION

Figure 1:
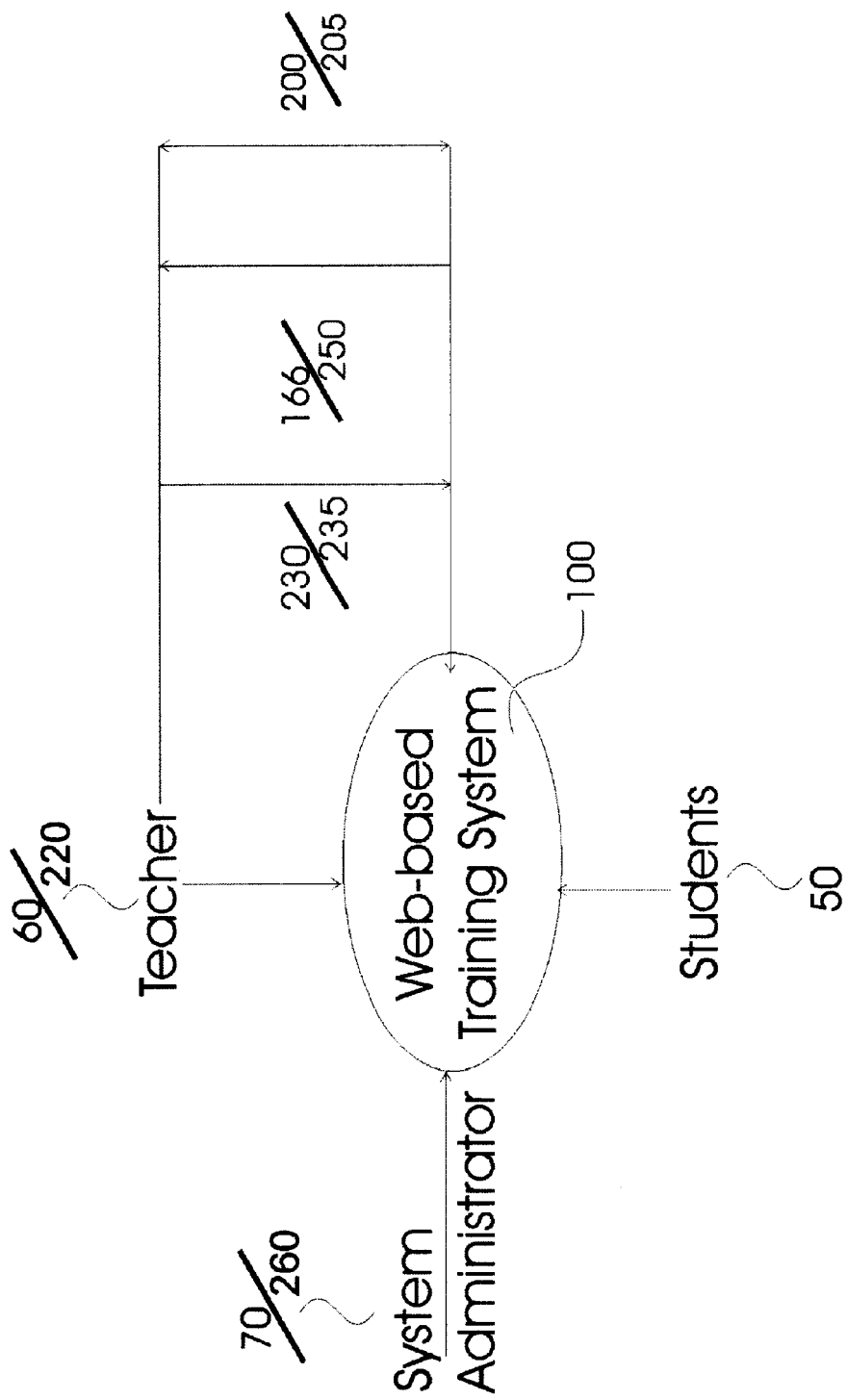
FIG. 1 provides a simplified system diagram showing the primary areas of interactivity between the teacher and student provided by the present system.

In the present invention, a student, a teacher, and optionally a system administrator can log onto the inventive learning website. Each participant can log onto the website at the same or different times. More specifically, a student or system administer need not log onto the website at the same time as the teacher. However, at any given time, a teacher or artificial intelligence (AI) module will be logged onto the website to assist the student. In a typical use of the system, a student will log onto an Internet-supported graphical user interface (GUI) of the web site to thereby gain access to the system. Thereupon the student can first review his training history and, thereafter, can access a menu of levels of practice examinations within the subject of interest to the student. Thereafter, the student can begin a selected training exam which need not be limited to multiple-choice questions.

As the student embarks upon the examination, the student is able to indicate in real time whether or not help is required at any given point or question of the exam. However, without regard to whether or not the student believes help is required, all responses of the student are subject to interactive evaluation in which either a teacher, who is on line with the same website at the time of the student, or an AI module, is able to intervene during an examination to invoke help options for the student. In the first instance, the teacher or AI module can intervene to change the exam level to either a lower one if the student has selected an exam level beyond his capability, or to a higher one if the student has selected an exam level which is not sufficiently difficult in the opinion of the teacher or AI module. The ability to intervene in real time and provide help while a student is taking an examination is a positive feature which is different than merely providing answers or help at the conclusion of the examination. Moreover, by enabling real time intervention, the student is given immediate real time guidance. This help enables the student to correct errors and strengthen the learning process. More specifically, the student can be immediately informed that the answer is incorrect and be provided with help to learn the correct answer before the end of the examination.

Among the help options available to a student who is proceeding with an examination within a given level are "auto coach" in which the student is provided with hints and examples; adaptive question selection in which variations of the same questions are drawn from a database; real time talk support in which the online teacher communicates with the student at the time that this option is invoked; and a multi-solution select option in which a database presents multiple means of problem solution in order to accommodate or discover the learning style of the student.

Answers to questions can be input through a variety of different interface means including keystroke, audio expression, graphic display, GUI pointer, or mouse. To keep the student apprised of his progress, the student can be scored, timed and graded in a variety of modes both during and after the examination. The online teacher or AI module again interacts with the student at the conclusion of an exam at which a grade or progress report is provided. Optionally, a system administration periodically logs onto the learning site to assure a daily backup of all activity and also monitors teacher performance within the various interactive aspects of the system as set forth above.

Accordingly, the invention provides a novel interactive distance educational method which is interactive, enables a student to employ input means with which the student is comfortable, and enables the student to learn at his or her own pace as the same is jointly determined by both the student and teacher or student and AI module. Moreover, the invention permits the student to select a learning style optimal to the student.

The invention further provides. a novel interactive method of distance learning, particularly applicable to examination training, which enables interactivity between a student, teacher or AI module, and an optional system administrator through the use of a common web site and graphical user interface thereof.

The invention provides an ability to collect geographically distributed teacher resources, with variable time availability, to form a high quality, cohesive training force. It enables selection by a student of a specific participating teacher where teachers in a given subject area are scarce. This ability has particular applications in rural and isolated areas in which the teacher and student are located. remotely from each other, and in situations in which there do not exist a sufficient number of teachers for classroom learning with reference to a given subject.

The invention still further provides an interactive distance learning system of the above type in which "auto coach," hints and examples, whether delivered by an online database, an AI module, or an online teacher, can be selected from any one of a plurality of didactic styles and stimuli including voice, audio, pictures, animation, symbolism, analogy and repetition.

With respect to the conceptual view of FIG. 1, there is shown the primary parties, namely, students 50, a teacher 60, and a system administrator 70, all of whom interact through a set of graphical user interfaces (GUI) of a dedicated learning Internet website of a web-based training system 100. Further shown in the conceptual diagram of FIG. 1 are the primary areas of interactivity between students 50 and teacher 60. These, more particularly, include a teacher intervene function 230, which, optionally, can include use of an AI module. Secondly, there is provided a real-time communication link 250 through which the student can communicate directly to teacher 60 or with an AI surrogate therefor. Such communication can include interactive text. Thirdly, a student is able to make an advance appointment to receive help from a particular teacher, which is noted by block 200. However, the scheduling of such appointments is mediated by an appointment management program 205, into which the teacher provides input as to availability.

Figure 2:
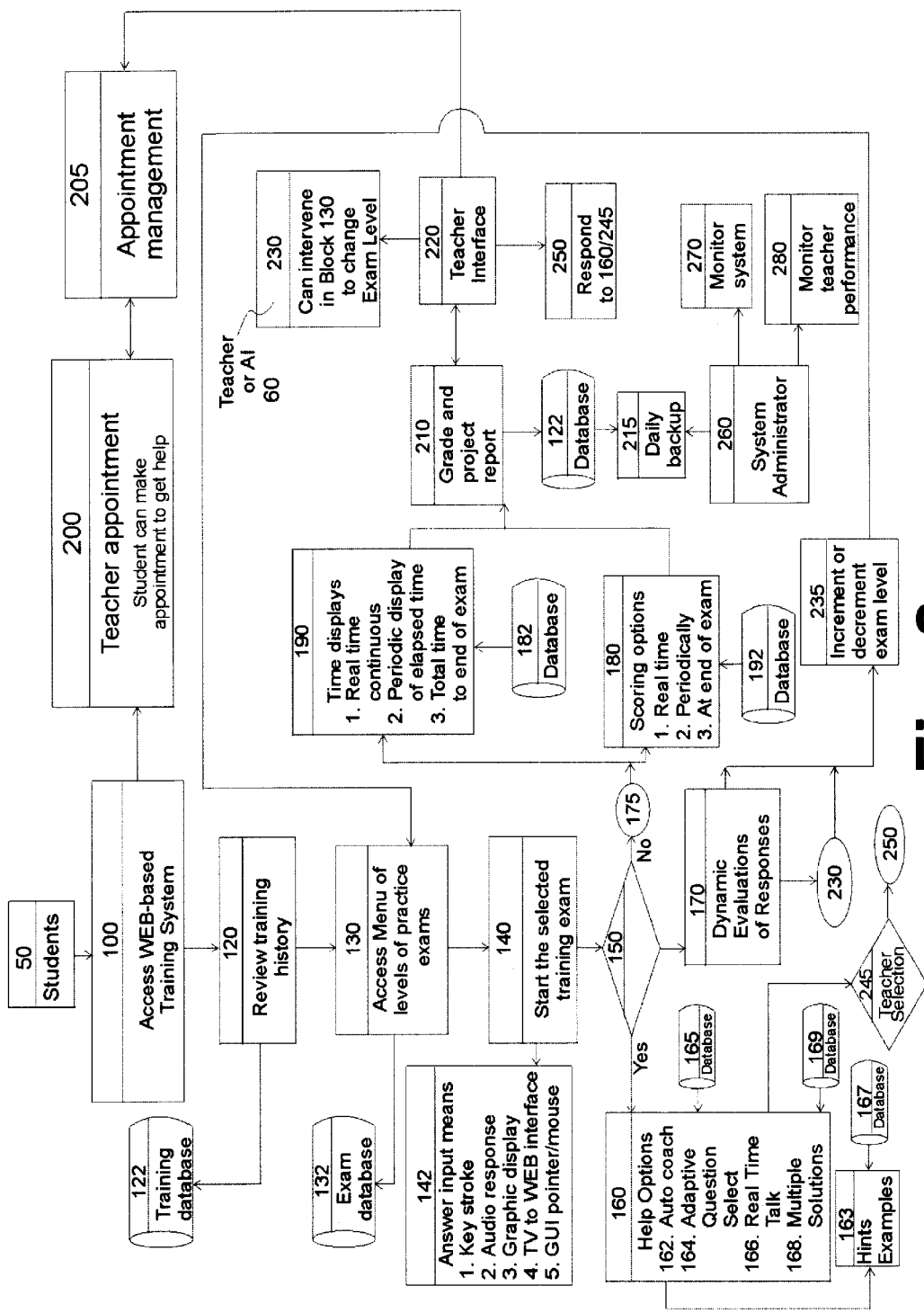
FIG. 2 provides a flow diagram of the inventive method and system.

With reference to FIG. 2, the inventive online exam training system can be more fully appreciated. That is, the program begins with access to the learning Internet website 100 through the use of an appropriate password or other means usable with a GUI of the dedicated website. Initially, the system will display for the student a review of his exam training history 120 which information is accessed from a training database 122.

Thereafter the student is provided a menu 130 of levels of practice examinations which are accessed from an examination database 132. Thereupon, at node 140 the student will start the selected training exam. To accommodate the learning style of the student, answers to questions can be input through a variety of different input means 142 including keystroke, audio expression, graphic display, GUI pointer or mouse. Once into the examination, the system is at all times functional within a "help and dynamic evaluation" mode which is generally indicated by program choice symbol 150, this representing the node of the system at which a number of events or options can occur. For example, if the student is aware that he is having difficulty, he can click on an options menu 160 which, particularly, includes auto-coach 162, adaptive question select 164, real time talk 166 with the teacher 60 or discussion of multiple solutions 168. In the auto-coach option 162, hints or examples 163 can be furnished out of an intelligent database 167. Through the auto-coach function, a student can be provided with appropriate hints and examples to assist in the solution of a given question or problem.

Proceeding to the second option, namely, adaptive question select 164, this comprises a means for keeping the student interested in the examination by substituting, in question sequence, questions which are comparable in difficulty to a given question upon which the student is working but which are worded, expressed or illustrated in a manner designed to increase the student's level of attention in the question. Such alternative or adaptive question forms are stored within database 165. The basis of such adaptive questions can be semantic or, alternatively, can reflect use of a different teaching methodology, for example, animation versus text, symbolism versus audio, or repetition versus analogy.

In the event that the student requires real time communication with a teacher 60, real time talk option 166 and teacher selection 245 are employed to select a particular teacher thereby enabling Internet real time communications link 250 from the student 50 to a selected teacher 60. Teacher selection 245 will typically require that a teacher appointment has been made at block 200, discussed above. However, by using real-time talk 166, the teacher 60 is able to interactively provide personal hints and examples relative to a given exam question which go beyond the capability of database 167.

Finally, where the student is interested in exploring different or multiple solutions of the same problem, as will often be the case in mathematical areas, option 168 can be selected from which access to database 169 is obtained.

As the training exam moves forward, a dynamic evaluation 170 of all responses occurs. This dynamic evaluation is communicated on-line to the teacher at teacher intervene function 230 at which point, the teacher is able to intervene, as is noted by block 235, to change the exam level of access menu 130. However, if the student is doing too poorly or too well, the system will by-pass teacher intervene function 230 and automatically change the level of the practice exam. The dynamic evaluation 170 also monitors student behaviors, such as selection of questions, selection of Help Options, and change of answers. The information obtained can be used to develop teaching strategies, to accumulate data for educational psychology, and other education related purposes.

As can be noted in the flow diagram of FIG. 2, teacher interface 220 represents the various Internet links, which can be effected to and from the teacher. Link 250, relative to real time talk 166 of the help menu 160, has been discussed above. Link 210 is discussed below.

In the event that the student believes that he does not need help, and both the teacher and the dynamic response evaluation 170 of the present system are in agreement, the student will. proceed to node 175 from which various scoring options 180 and time displays 190 will be furnished to the student. The scoring options are drawn from a database 182 which include real time scoring, periodic scoring, and scoring at the end of the examination. Similarly, time display menu 190 includes real time display, periodic display of lapsed time, total time of exam, and collection of data on student behavior during exam execution. These are provided from a database 192. The scoring and time-related data from menus 180 and 190 are then provided to a grade and progress report 210 which is then stored within the general training database 122. This information will also be furnished to the teacher interface 220.

Further shown in the system diagram of FIG. 2 is daily backup 215, as well as the functions of a system administration 260 which include system monitoring, which occurs through Internet link 270, and the monitoring of teacher performance which occurs through an Internet link 280.

While there has been shown and described the preferred embodiment of the instant invention it is to be appreciated that the invention can be embodied otherwise than is herein specifically shown and described and that, within said embodiment, certain changes can be made in the form and arrangement of the parts without departing from the underlying ideas or principles of this invention as set forth in the Claims appended herewith.

What is claimed is:

1. A system of interactive distance learning and examination training comprising:
    (a) a website having a graphical user interface;
    (b) an archival training database accessible from said website, said training database containing a menu of levels of practice examinations accessible through said graphical user interface;
    (c) a module interface means which notifies a teacher or artificial intelligence module that a student has logged onto said website;
    (d) a means for selection by said student of one of said examinations from said practice examination;
    (e) a means to enable a student to provide an answer to said examination through said graphical user interface;
    (f) a means for providing selectable on line student help options available to a student after an examination has commenced;
    (g) a means for evaluation of student answers; and
    (h) a means for generating performance displays of said student the examination selected by said student and a database for storing information associated with each examination taken by said student.

2. The system of claim 1, wherein the means for providing selectable student help options comprises options for self-help, adaptive question selection, on-line interaction with said teacher, and review. of multiple possible solutions.

3. The system of claim 2, which further comprises a means for appointment management of a specific teacher for use in association with on-line interaction with said specific teacher.

4. The system of claim 1, wherein the means for evaluation of student responses comprises changing the difficulty level of questions contained in said examination while the student is taking the examination.

5. The system of claim 1, wherein said a means for evaluation of student responses comprises real-time observation of evaluation of student responses.

6. The system of claim 1, wherein said means to enable a student to provide an answer to said examination through said graphical user interface comprises a keystroke, audio response, graphic display, web TV interface, graphical user interface pointer or touch screen means, and mouse.

7. The system of claim 1, which further comprises a means for system administration.

8. A system of interactive distance learning and examination training, the system comprising:
    (a) a dedicated web site having a graphical user interface (GUI);
    (b) an archival training database accessible therefrom;
    (c) means for notification of a teacher, or AI surrogate, that a student has logged onto said system, said notification means including an on-line teacher interface;

(d) a menu of levels of practice examinations accessible through said GUI;

(e) mean for selection of one of said examinations of said menu of practice examination;

(f) selectable on-line student help options, available to a student after an exam has commenced, said options including options for self-help, adaptive question selection, on-line interaction with said teacher, and review of multiple possible solutions;

(g) means for dynamic evaluation of student responses including means for incrementing and decrementing the level of examination difficulty; and (h) means for generation of time and performance displays of each practice examination taken by a student and databases for storing information associated therewith.

9. The system of claim 8 further comprising selectable means for answer input to said graphical user interface, said means including keystrokes, audio response, graphic display, web TV interface, GUI pointer or touch screen, and mouse.

10. The system of claim 9 in which said dynamic evaluation means comprises one or more of artificial intelligence software means and real-time observation of student performance.

11. The system of claim 10 further comprising means for system administration.

12. The system of claim 8 further comprising a means for teacher appointment and appointment management for use in association with said on-line student-teacher interaction of said selectable on-line student help option 8 (f) above.

13. A method of interactive distance learning and examination training comprising:

(a) providing a website having a graphical user interface;

(b) providing an archival training database accessible from said web site, said training database containing a menu of levels of practice examinations accessible through said graphical user interface;

(c) providing a module interface means which notifies a teacher or artificial intelligence module that a student has logged onto said website;

(d) selecting by said student of one of said examinations from said practice examination;

(e) enabling a student to provide an answer to said examination through said graphical user interface;

(f) providing selectable on line student help options available to a student after an examination has commenced;

(g) evaluating of the student answers; and (h) generating performance displays of said student the examination selected by said student and a database for storing information associated with each examination taken by said student.

14. The method of claim 13, wherein providing selectable student help options comprises options for self-help, adaptive question selection, on-line interaction with said teacher, and review of multiple possible solutions.

15. The method of claim 14, which further comprises a appointing of a specific teacher for use in association with on-line interaction with said specific teacher.

16. The method of claim 13, wherein the evaluating of student answers comprises changing the difficulty level of questions contained in said examination while the student is taking the examination.

17. The method of claim 13, wherein said enabling a student to provide an answer to said examination through said graphical user interface comprises a keystroke, audio response, graphic display, web TV interface, graphical user interface pointer or touch screen means, and mouse.

18. The method of claim 13, wherein said evaluating of student responses comprises real-time observation of evaluation of student responses.

19. The method of claim 13, which further comprises providing for a system administration which monitors teacher and system performance.

20. A method of interactive distance learning and examination training, the method comprising the steps of:

(a) providing a dedicated web site having a graphical user interface (GUI);

(b) providing an archival training database accessible therefrom;

(c) providing notification of a teacher, or AI surrogate therefor, that a student has logged onto said system, said notification including provision of an on-line teacher interface to the student and GUI;

(d) providing a menu of levels of practice examination successful through said GUI;

(e) providing means for selection of one examination of said levels of practice examination;

(f) providing to the student selectable on-line help options, available after a practice exam has begun, said options including options for self-help, adaptive question selection, on-line interaction with said teacher, and review of multiple possible solutions;

(g) providing dynamic evaluation of student responses, said evaluation including, means for selectable incrementing and decrementing the level of examination difficulty; and (h) generation of time and performance displays of each practice exam taken by a student and providing databases for the storing of data associated therewith.

21. The method of claim 20 further including the step of providing selectable means for answer input to said GUI, said means including keystroke, audio response, graphic display, web TV, GUI pointing or touch screen means, and mouse.

22. The method of claim 21 further comprising the step of providing system administration.

23. The method of claim 20 in which said dynamic evaluation step further includes the step of providing one or more of AI software means and real-time teacher observation of student performance.

24. The method of claim 20 further comprising the step of providing teaching appointment and appointment management means usable with said on-line student teacher interaction of said selectable on-line student help options of Step(f).

* * * * *